(No Model.)
C. EASTERLING.
BROADCAST SEEDING MACHINE.
No. 363,053. Patented May 17, 1887.
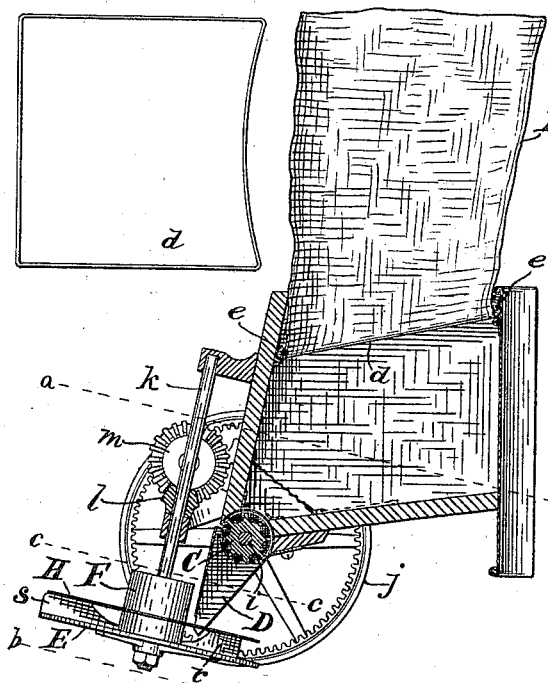
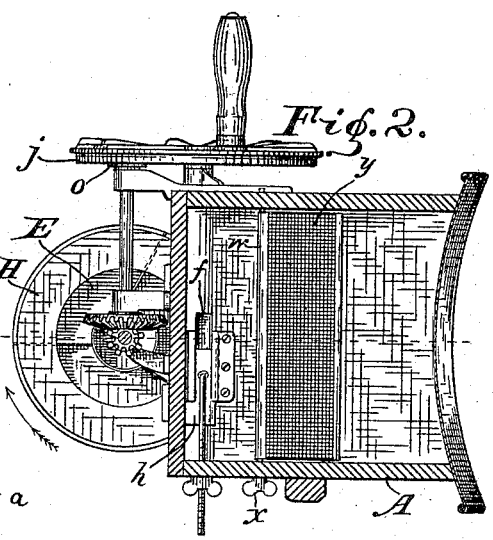
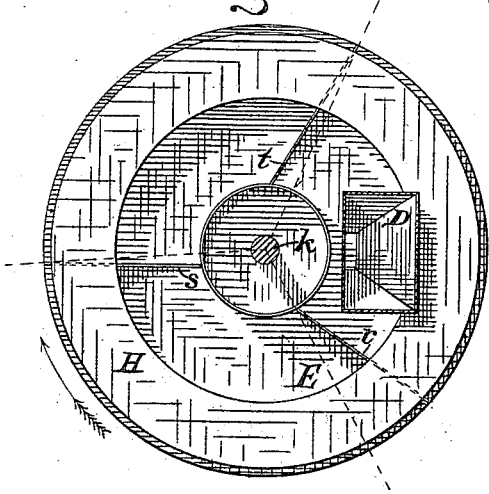
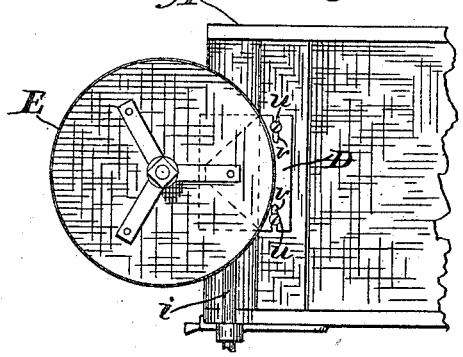
Witnesses
Chas. N. Leonard.
V. M. Hood.
Inventor
Caleb Easterling
By His Attorney
H. P. Hood.

UNITED STATES PATENT OFFICE.

CALEB EASTERLING, OF FRIENDSWOOD, INDIANA.

BROADCAST SEEDING-MACHINE.

SPECIFICATION forming part of Letters Patent No. 363,053, dated May 17, 1887.

Application filed January 15, 1887. Serial No. 224,407. (No model.)

*To all whom it may concern:*

Be it known that I, CALEB EASTERLING, a citizen of the United States, residing at Friendswood, in the county of Hendricks and State of Indiana, have invented a new and useful Improvement in Broadcast Seeding-Machines, of which the following is a specification.

My invention relates to an improvement in broadcast seeding-machines of that class in which the seed is carried in a suitable receptacle secured to the body of the operator, and is thrown by means of a revolving disk.

The objects of my improvements are to provide a seed-throwing disk from which the seed shall be evenly distributed, in nearly a horizontal plane, in front and to each side of the operator, but which shall throw no seed backward against his body; to provide means for controlling the throwing of the seed more or less to one side, and to provide a screen for separating foreign matter from the seed within the hopper, which screen may be quickly adjusted for use or dispensed with at the will of the operator, all as hereinafter fully described.

The accompanying drawings illustrate my invention.

Figure 1 is a vertical section, the throwing-disk being shown in elevation. Fig. 2 is a transverse section at *a*, Fig. 1. Fig. 3 is a partial plan, as seen from below, at *b*. Fig. 4 is a section on an enlarged scale at *c*, Fig. 1.

A is the hopper.

B is a bag-like extension of the hopper, which is removably secured in position by means of a rectangular hoop of wire, *d*, Fig. 1, which is secured in the lower edge of the bag and engages lugs *e e*, secured to the inside of the hopper.

C is the feed-wheel into which the seed passes from the bottom of the hopper through an opening, *f*, Fig. 2, which is covered more or less, to control the flow of seed, by a sliding valve, *h*. Wheel C is mounted on a shaft, *i*, on which is also mounted the internal gear-wheel, *j*.

D is a tapering chute which conducts the seed from the feed-wheel to the throwing-disk E. The throwing-disk E is mounted on a vertical inclined shaft, *k*, which is revolved by means of the bevel-gears *l* and *m*, shaft *n*, pinion *o*, and internal gear-wheel, *j*.

F is a cylindrical shield mounted centrally on disk E for the purpose of keeping the seed away from the center.

The throwing-disk is arranged to revolve from left to right, as indicated by the arrows, Figs. 2 and 4. Secured to the upper surface of disk E are a series of radial wings, *r*, *s*, and *t*. The outer ends of the upper edges of said radial wings are connected and the spaces between them covered by a thin annular plate, H.

For the purpose of retaining the seed so that it shall be discharged at different points, wings *r*, *s*, and *t* are arranged at different angles to the path of rotation of the disk, as indicated by the dotted radial lines in Fig. 4. It will be observed that the wing *r* is inclined backward, while wings *s* and *t* are inclined forward, wing *t* being inclined forward more than wing *s*. This arrangement of the wings has been found by careful experiment to result as follows: The seed that falls from chute D onto the disk E and in front of wing *r* will, as the disk is revolved, escape when the wing has reached the position shown in Fig. 4, while the seed falling in front of the wings *s* and *t*, wing *t* being inclined at a greater angle than wing *s*, is retained longer and is evenly distributed over that portion of the circle embraced between the forward surfaces of wings *r* and *t*, the whole escaping by the time that wing *t* reaches the position shown.

For the purpose of regulating the point of discharge from the throwing-disk toward either side, chute D is adjustably secured to the hopper by screws *u u*, passing through slotted holes *v v* in the chute. It is obvious that the seed will acquire sufficient momentum to overcome the resistance of the disk and the wings while passing over a certain space, so that if the chute is moved so as to discharge a little farther to the left, the seed will escape sooner toward the right, or if moved toward the right, the seed will be discharged nearer the front.

For the purpose of separating foreign matter from the seed in the hopper, I mount a rod, *w*, in suitable bearings in the sides of the hopper next the bottom. Said rod extends through the side of the hopper and is provided with a thumb-lever, x, by means of which it may be turned. Secured to rod w is a light frame inclosing a wire screen, y. When rod w is turned forward, the screen is thrown into the position for use, above the opening f, as shown in Fig. 1, and by turning the rod backward the screen is thrown flat against the bottom of the hopper.

I claim as my invention—

1. In a broadcast seeding-machine, the combination of the hopper, the feed-wheel, the chute, the throwing-disk, and means for revolving said feed-wheel and throwing-disk, said throwing-disk being provided with radial wings secured to the surface thereof at different angles to the path of rotation of the disk, substantially as and for the purpose specified.

2. In a broadcast seeding-machine, the combination, with the throwing-disk arranged to revolve, of the series of vertical radial wings secured to the working-face of the disk and arranged at different angles to the path of rotation, one of said wings being inclined backward and the other wings being inclined forward successively in a greater degree, substantially as specified.

3. In a broadcast seeding-machine, the combination, with the hopper, the feed-wheel, the throwing-disk having a series of radial wings arranged at different angles, and means for revolving said feed-wheel and throwing-disk, of the chute arranged to conduct the seed from the feed-wheel to the throwing-disk and adjustably secured to the hopper, substantially as and for the purpose specified.

4. In a broadcast seeding-machine, the combination, with the hopper and the feed-wheel, of the rod w and screen y, all arranged in the manner and for the purpose specified.

CALEB EASTERLING.

Witnesses:
H. P. HOOD,
V. M. HOOD.